3,463,320
MICROSPHERE FILTER
James A. Patterson, Los Altos, Calif., assignor to Sondell Research & Development Company, Palo Alto, Calif.
Filed Feb. 25, 1966, Ser. No. 530,051
Int. Cl. B01d 29/08, 29/00
U.S. Cl. 210—232                                                                 2 Claims

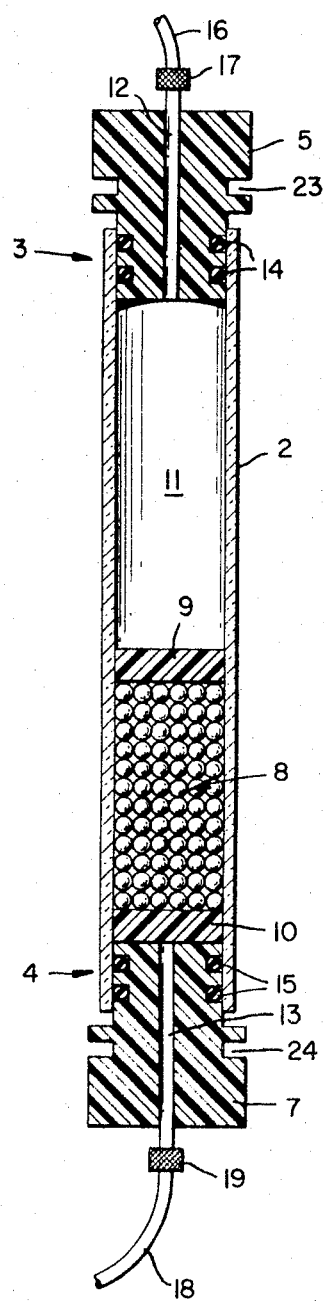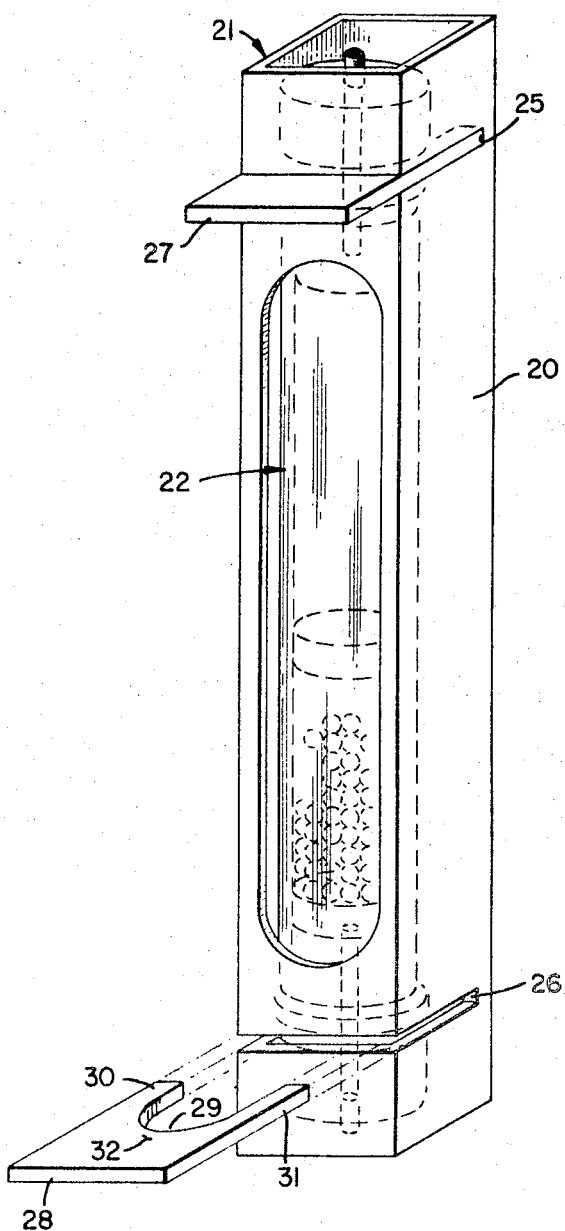

ABSTRACT OF THE DISCLOSURE

An apparatus for separating collodial particles from pressurized fluid comprising a column packed with uniform spherical beads. The beads are incompressible and are formed from cross-linked co-polymer of polyvinyl aryl compound and a monovinyl aryl compound. The column walls are electrically neutral. The apparatus includes further a support frame and releasable interlocking means cooperating with the frame and the column.

---

This invention relates to a microsphere filter. More particularly, it relates to a microsphere filter formed with certain physically constant or incompressible copolymer beads and to its use in the pressure filtration of fluids containing charged colloidal particles.

Filters utilizing spheres of micron size for purposes of filtration have been described previously, such as in U.S. Patent 3,182,803, to Chisholm. In these prior filters, the spherical beads have been made from metals, although the use of plastics, such as the polyfluoroethylenes, has also been suggested. However, filtration of highly charged colloidal particles, such as biological molecules contained in a biological fluid is not advantageously executed with such prior art filters. In general, metals cause a discharge of the electrical charge on the colloidal particles which in turn permits the particles to form a mass of scum instead of retaining the discrete particulate character that they had prior to discharge.

In the charged state, the charges on the particles are of like sign and the particles therefore repel each other. The particulate character of the materials is thereby retained. If discharged, when the particles are trapped by the filter beads, a scum-type mass is formed and flow is interrupted by the mass. A build-up of back pressure follows which contributes either to a slow-down in the filtration process or places excessive demands on the filtration system in terms of pressure requirements. Considering that filtration of colloidal particles, even when they can be retained in the colloidal particulate form, requires pressures on the filtration system of about 500–50,000 p.s.i., any phenomenon that places even higher demands on the amount of pressure required is highly undesirable.

The alternative types of materials that have been suggested which may avoid poisoning and discharge of the type of solute here of concern are not capable of withstanding the normal pressures encountered in this type of filtration. For example, the polyfluoroethylene type of plastic deform at the low end of the pressure range normally used in the filtration of charged colloidal particles. It is clear that when the spherical nature of the beads which form the filter are deformed the lowered efficiency of the filter resulting from the non-uniform pores defeats the purposes of the filter.

The present invention provides a filter that can be successfully used for the filtration of charged colloidal particles and which avoids all of the problems of the filters and materials previously used. In the preferred embodiment, a filter is formed from spherical beads of a cross-linked copolymer of a polyvinyl aryl compound and a monovinyl aryl compound. The beads are formed so as to have substantially uniform size and, therefore, provide efficient filtration through uniform pores between the beads. At the same time, this unique copolymer, by virtue of its cross-linking and chemical structure, is physically constant for present purposes. Of most significance is the fact that this type of resin is substantially incompressible under elevated temperatures and pressures of the magnitudes encountered in filtration of colloidal particles. Therefore, they do not deform and adversely affect the filtration properties of the bed.

At the same time, by virtue of the character of the resin as it exists in the filter bed of this invention, there are no interfaces to be wet by the fluid media containing the colloidal particles to be filtered and the colloidal particles, such as bacteria, build up and are trapped in the filter bed as discrete entities and not as an agglomerate which clogs the filtering media. In contrast with prior microsphere filters, the present resins do not discharge the colloidal particles and the particles continue to repel each other and remain as discrete particles.

The resins and filter assembly of this invention have other advantageous features and properties which will be discussed in connection with the drawing.

In the accompanying drawing:

FIGURE 1 shows a schematic side sectional view of a filter containing copolymer resinous beads of the type found useful in practicing the present filtration method.

FIGURE 2 shows a perspective view of the filter of FIG. 1 in a suitable frame designed for colloidal filtration under pressure.

With reference to FIG. 1, the present filter includes an elongate chamber 2 formed from a rigid material capable of withstanding the normal filtration pressures and which is preferably electrically neutral to the charged colloidal particles processed therethrough so that they will not be discharged to cause their agglomeration. Glass is an example of a suitable material to be used for this purpose which has the added advantage of being transparent so that conditions inside the filter can be monitored during use.

Chamber 2 may be considered to have an upstream end 3 and a downstream end 4. Closure stopper 5 is inserted in upstream end 3 and a similar closure stopper 7 in downstream end 4. A filtration bed 8 formed from incompressible spherical beads is disposed in chamber 2 at the downstream end thereof. Beads 8 are packed between a pair of porous retaining plugs 9 and 10.

The beads forming bed 8 are copolymers of the type noted and which have been generally described in U.S. Patent 2,366,007, to D'Alelio. The copolymers are formed by a conventional catalyzed polymerization reaction and are made from a monovinyl aryl compound, such as styrene (vinyl benzene), vinyl toluenes, vinyl naphthalenes, vinyl ethyl benzenes, alpha-methyl styrene, vinyl chlorobenzenes and vinyl xylenes. The selected monomer is cross-linked with a suitable polyvinyl aryl compound, such as the divinyl benzenes, divinyl toluenes, divinyl naphthalenes, divinyl xylenes, divinyl ethyl benzenes, divinyl chlorobenzenes and divinyl-phenyl vinyl ethers. Preferred beads for present purposes are made from styrene cross-linked with divinyl benzene.

The beads have an essentially spherical configuration for efficient bed formation and are highly uniform in size, i.e., substantially equal diameters so that the pores of the bed resulting therefrom are uniform. When the bed is formed with such uniform spherical beads the resulting constant geometry makes possible the use of a mathematical formula to determine in advance the bed configuration necessary to obtain a desired degree of particle retention of a given size. Because of the uniform characteristics of the bed, such a determination is dependent primarily on the particle diameter and bed depth. (See "Micromeritics," the Technology of Fine Particles, 2nd edition, J. M. Dallavalle, pp. 298–290.)

Using the developed formula reported by Dallavalle for 30% packing or void volume on the smallest bead diameter ($d$), the diameter of the particle being filtered that will be retained will be approximately $\frac{1}{10} d$. Distillation plate theory can then be applied to determine the depth of bed required for the desired probability of retention. Where the diameter of the largest bead in the bed (D) is the thickness of a single plate in the filter bed, a bed of 300 D offers approximately 99.9% probability of retention.

As an example, the present filter system can be practiced using styrene-divinyl benzene copolymer spherical "Micule" beads having diameters varying from 20–30 microns (obtained from Microspheres, Inc., 931 Commercial Street, Palo Alto, California). A 300 D bed packed with these beads is 300×30 or 9000 microns (9 mm.) high and will retain 99.9% of 2 micron particles contained in the fluid media passed through the bed. ($\frac{1}{10} d = \frac{1}{10} \times 20 = 2$ microns.)

Referring back to FIG. 1, it will be appreciated that filtration chamber 2 is adapted for holding variable bed depths which are determined to be necessary for the specific materials being filtered. For example, porous plug 9 can be placed closer to the upstream end 3 by moving it further upwardly in space 11 and more beads can be placed in bed 8. Conversely, bed 8 can be made smaller by removing some beads and moving porous plug 9 downwardly towards downstream end 4.

Inlet stopper 5 defines an inlet conduit 12 therethrough and outlet stopper 7 defines an outlet conduit 13 therethrough to complete a fluid flow path through chamber 2, porous plugs 9 and 10, and bed 8. Stoppers 5 and 7 are suitably sealed relative to the inside walls of chamber 2 with a plurality of pairs of O-rings 14 and 15.

An input channel 16 can be suitably engaged to conduit 12 with a threadable connector 17, which brings material to be filtered into the unit. Similarly, a discharge channel 18 can be joined to conduit 13 in stopper 7 with a threaded connector 19 for flowing filtered fluid media away from the unit.

Stoppers 5 and 7 and porous plugs 9 and 10 can be made from any suitable material and are preferably made from plastics, such as the polyfluoroethylene plastics. The important point to note in regard to selection of materials is that within the filtration bed 8 the beads themselves and the immediately surrounding walls of chamber 2 are electrically neutral to the particles and do not cause their discharge and agglomeration in the filter bed so that plugging and development of excessive back pressure are avoided.

The unit is thus uniquely suited for the pressure filtration of colloidally charged particles in a fluid media. Typically, the filter is contemplated for the filtration of biological molecules, such as bacteria, yeast, amino acids and the like present in an aqueous media such as blood serum. Alternatively, charged colloidal particles such as bacteria can be filtered from organic media such as jet fuels because of the highly stable nature of the bead copolymer. Where the degree of cross-linking of the beads is suitably high, organic solvents, including the highly degradative chlorinated aromatic hydrocarbons and aliphatic solvents, can be processed through the filter without significant adverse effect on the filter bed.

Since the bed and filter do not cause a discharge of the colloidal particles, the particles remain in an easily removable form and the bed can be conveniently cleaned by back flushing with solvent so that the filter can be used repeatedly. In this way, constant filtration parameters are obtained due to repeated use of the same filter bed. The resulting consistency of results is not possible where the filters are of the type which can not be cleaned and reused.

The unique character of the resins utilized in the bead formation for the present filters presents an additional advantage. Depending upon the chemical structure of the copolymers, the beads are porous to aqueous or organic solvents and will retain such solvents and swell. This property makes it possible to filter water and organic colloidal droplets present in organic and aqueous solvents, respectively, concurrently with the filtration of colloidal particles. Thus, where a biological colloidal particle, such as bacteria, is being filtered from an aqueous fluid containing colloidal droplets of organic solvent dispersed in the aqueous fluid, the bead may be selected so that it is free from fixed ionic groups present in the molecular structure of the resin. With such a bed properly formed as to height and bead diameter, colloidal particles will be trapped in the interstices of the beads and the colloidal organic droplets will be sorbed and retained interiorly of the beads themselves. A concurrent multi-filtration function is thereby achieved.

Conversely, where the fluid media is of an organic nature, such as a jet fuel, and the media contains colloidally dispersed water droplets, as well as colloidal particles to be filtered, the cross-linked resin selected should contain fixed ionic groups, such as sulfonic acid groups or phosphonic acid groups and the beads will sorb and retain the colloidal water while the colloidal particles are trapped in the usual way. Preparation of resins containing fixed ionic groups is well known in the art and is discussed in the above cited D'Alelio patent.

With reference to FIG. 2, the filter structure of FIG. 1 can be conveniently slid interiorly of a frame 20 through open top 21. Frame 20 may suitably include an open viewing area 22 so that the action inside the filter chamber 2 can be observed during use. When utilizing this embodiment, stoppers 5 and 7 are suitably formed with concentric grooves 23 and 24 therein. Frame 22 is also formed with correspondingly spaced notches 25 and 26, respectively.

A pair of clips 27 and 28 are provided which mesh within notches 25 and 26. The clips, such as 28, have an internal arcuate area 29 which conforms to the surface of the stoppers, such as stopper 7 within its groove 24. Tongues 30 and 31 of clip 28 are designed for a snug fit within slot 26 with the lip 32 of arcuate area 29 seated within groove 24 of stopper 7. In this way, stopper 7 and thereby chamber 2 is interlocked with frame 20. Similarly, clip 27 interlocks stopper 5 at the other end with frame 20. This arrangement secures stoppers 5 and 7 within chamber 2 even during the application of the relatively high pressures normally developed during colloidal particle filtration. At the same time, the illustrated structure provides a unit that can be quickly disassembled and supplementary filtration chambers quickly engaged into the filtration line for operation with different substances which may sequentially be flowed through input channel 16.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A pressure filter for separating colloidal particles from fluid media comprising: an elongate chamber formed with walls that are electrically neutral, an inlet conduit connected to the upstream end of said chamber and an outlet conduit connected at the downstream end of said chamber, a plurality of substantially uniformly sized spherical beads formed from a cross-linked co-polymer of a polyvinyl aryl compound and a monovinyl aryl compound to be incompressible when subjected to fluid pressure, said beads being disposed in said chamber in the downstream end thereof, a pair of porous retaining plugs within said chamber to maintain said beads therebetween in a packed bed configuration, said beads being of such diameter and the bed being of such depth so as to remove substantially all said particles from said media, a support frame for said chamber, removable closure members each having a groove, said members being press-fitted into the upstream and downstream ends of said chamber with said grooves being exterior of said chamber, and releasable means cooperating with said grooves to interlock said closure members, chamber and frame against pressures developed in said chamber during filtration and to permit rapid removal of said chamber from the frame and replacement thereof.

2. A filter assembly in accordance with claim 1 wherein said support frame comprises a housing which surrounds said chamber and defines an aperture so that said chamber can be viewed from without said housing, and including slots in said housing alignable with the grooves in said closure members, said releasable means comprising a pair of removable clips for simultaneous insertion into the slots of said frame and grooves of said closure members to interlock the same.

References Cited

UNITED STATES PATENTS

| | | | |
|---|---|---|---|
| 2,366,007 | 12/1944 | D'Alelio | 210—36 X |
| 2,579,053 | 12/1951 | Schulstadt | 210—94 X |
| 3,182,803 | 5/1965 | Chisholm | 210—282 X |
| 3,265,215 | 8/1966 | Emneus et al. | 210—446 X |
| 3,266,628 | 8/1966 | Price | 210—282 X |

SAMIH N. ZAHARNA, Primary Examiner

U.S. Cl. X.R.

210—94, 282